United States Patent
Ruetten et al.

(10) Patent No.: US 8,772,727 B2
(45) Date of Patent: Jul. 8, 2014

(54) X-RAY DETECTOR

(75) Inventors: Walter Ruetten, Linnich (DE); Rainer Kiewitt, Roetgen (DE); Olaf Wischhusen, Aachen (DE)

(73) Assignee: Trixell, Moirans (FR)

(*) Notice: Subject to any disclaimer, the term of this patent is extended or adjusted under 35 U.S.C. 154(b) by 124 days.

(21) Appl. No.: 13/130,918

(22) PCT Filed: Nov. 20, 2009

(86) PCT No.: PCT/IB2009/055211
§ 371 (c)(1),
(2), (4) Date: May 24, 2011

(87) PCT Pub. No.: WO2010/058369
PCT Pub. Date: May 27, 2010

(65) Prior Publication Data
US 2011/0240868 A1    Oct. 6, 2011

(30) Foreign Application Priority Data
Nov. 24, 2008 (EP) ................................ 08169737

(51) Int. Cl.
*G01T 1/20* (2006.01)

(52) U.S. Cl.
USPC ............... 250/369; 250/336.1; 250/370.01; 250/371

(58) Field of Classification Search
CPC ... H01L 27/14676; G01T 1/20; G01T 1/2018; G01T 1/247; G01T 1/17; G01T 1/24
USPC ......................................................... 250/369
See application file for complete search history.

(56) References Cited

U.S. PATENT DOCUMENTS

| | | | |
|---|---|---|---|
| 6,410,899 B1 * | 6/2002 | Merrill et al. | 250/208.1 |
| 6,882,367 B1 * | 4/2005 | Merrill et al. | 348/308 |
| 2006/0113483 A1 * | 6/2006 | Sugihara et al. | 250/370.11 |
| 2007/0007434 A1 * | 1/2007 | Pain | 250/208.1 |
| 2008/0251691 A1 * | 10/2008 | Adachi | 250/206 |

FOREIGN PATENT DOCUMENTS

| | | |
|---|---|---|
| DE | 3001131 A1 | 7/1981 |
| JP | 62266482 A | 11/1987 |
| WO | 2006080004 A2 | 8/2006 |
| WO | 2006124592 A2 | 11/2006 |

OTHER PUBLICATIONS

Lai et al: "High Dynamic Range Active Pixel Sensor Arrays for Digital X-Ray Imaging Using a-Si:H"; Journal of Vacuum Scinece and Technology:Part A, vol. 24, No. 3, May/Jun. 2006, pp. 850-853.

* cited by examiner

*Primary Examiner* — Marcus Taningco
(74) *Attorney, Agent, or Firm* — Baker & Hostetler LLP

(57) ABSTRACT

The application describes an X-ray detector for use in a medical equipment, wherein the detector comprises an unit for transforming X-ray radiation into electrical charge, a first capacitor for being charged by an electrical charge, wherein the first capacitor is electrically connected to the unit for transforming, a second capacitor for being charged by an electrical charge, and a first gain switching gate, wherein the second capacitor is electrically connected with the unit for transforming if the first gain switching gate is in on-state, wherein the detector is adapted to switch on the first gain switching gate for short periods. Further the application describes an X-ray system comprising a detector according to the invention, wherein the system is adapted for gain selection, wherein the detector is adapted to switch on the first gain switching gate for short periods. Further, the application describes a method for using a detector according to the inventive concept, wherein the first gain switching gate is switched on only for short periods of time for redistribution of electrical charge between the first capacitor and the second capacitor.

13 Claims, 8 Drawing Sheets

X-RAY DETECTOR

FIELD OF THE INVENTION

The present invention relates to an X-ray detector for use in a medical equipment, an X-ray system comprising a detector and a method for using a detector.

BACKGROUND OF THE INVENTION

CMOS based X-ray imaging systems are often based on arrays of active pixel sensors. In medical equipment, it is required to make use of all X-radiation that was applied to the patient. Hence there is a requirement to not ignore any signal originating from the X-radiation. Therefore, there are required means to select various gain settings within each pixel cell.

SUMMARY OF THE INVENTION

Starting from a normal active pixel cell, gain selection can be done for example by adding capacitors to the signal collection node. The signal collection node is usually a photodiode for indirect conversion detectors or a charge collection contact for direct conversion detectors. A crucial problem of pixel sensors in CMOS based X-ray detectors is the fact that they suffer from leakage in activated gain switches and transfer gates.

This invention proposes to drive the gain switches or transfer gates with a low duty cycle and a high frequency pulse train. The inventive driving scheme reduces the active (on) time and consequently the leakage current contribution of the switches. The high frequency activation of the switch still allows the transfer of charges from the smallest capacitor to the larger ones before the smallest node goes into saturation. In that way, low leakage and high saturation charge can be obtained at the same time. Low noise and high dynamic range are maintained.

According to a first aspect of the invention an X-ray detector for use in a medical equipment is provided, wherein the detector comprises an unit for transforming X-ray radiation into electrical charge, a first capacitor for being charged by an electrical charge, wherein the first capacitor is electrically connected to the unit for transforming, a second capacitor for being charged by an electrical charge, and a first gain switching gate, wherein the second capacitor is electrically connected with the unit for transforming if the first gain switching gate is in on-state, wherein the detector is adapted to switch on the first gain switching gate for short periods.

The gain switching gate, e.g. a transistor, has no leakage currents in case the gate is switched off. Only in case the gate is switched on there are leakage currents. Therefore, it is an aspect of the invention to reduce the on-state phases as far as possible. For example the on-state phases can be reduced in duration or the on-state phase can be divided into on-pulses instead of an on-going phase of on-state.

According to a second aspect an X-ray system comprising an inventive detector according to one of the claims 1 to 10 is provided, wherein the system is adapted for gain selection, wherein the detector is adapted to switch on the first gain switching gate for short periods.

According to a third aspect it is provided a method for using an inventive detector according to one of the claims 1 to 10, wherein the first gain switching gate is switched on only for short periods of time for redistribution of electrical charge between the first capacitor and the second capacitor.

Further embodiments are incorporated in the dependent claims.

According to an exemplary embodiment it is provided a detector, wherein the first capacitor is an intrinsic capacitor of the unit for transforming.

Typically, the unit for transforming is a photodiode. This photodiode has a capacitance because of the internal arrangement of the photodiode. With the help of this intrinsic capacitor the charge generated by the photodiode can be accumulated.

According to an exemplary embodiment it is provided a detector, wherein the unit for transforming comprises a photodiode for transforming X-ray radiation into electrical charge.

According to a further exemplary embodiment it is provided a detector, wherein the unit for transforming comprises a scintillator for transforming X-ray radiation into another radiation, a photodiode for transforming the other radiation into electrical charge.

Flat-panel X-ray detectors are built using a large area X-ray converter and an electronic detection system, which comprises a matrix of pixels. In so called indirect conversion detectors, incident X-radiation is converted by a scintillator into radiation of a different wavelength, usually in or near the visible spectrum. This different wavelength signal is then converted by means of a photodiode into an electrical signal/charge. The electrical signal/charge collected in each pixel of the matrix is read out to form the image.

In so called direct conversion detectors, incident X-radiation is converted by a photoconductor directly into electron-hole pairs. The resulting charge is collected by a charge collection electrode and forms the electrical signal/charge. The electrical signal/charge collected in each pixel of the matrix is read out to form the image.

According to another exemplary embodiment it is provided a detector, wherein the unit for transforming comprises a photoconductor for transforming X-ray radiation into electrical charge, and a charge collection electrode for collecting the electrical charge.

According to an exemplary embodiment it is provided a detector, wherein the first gain switching gate is a gain switching transistor. Typically, the gate is a transistor, e.g. a npn/pnp (bipolar)-transistor or a field effect transistor (e.g. a MOS-Fet-transistor).

According to an exemplary embodiment it is provided a detector, wherein the detector is adapted to switch on the first gain switching gate if the charge of the first capacitor has reached a definite threshold.

The controlling of the gain switching gate can be adjusted to the amount of charge, which is accumulated by the capacitor for storing the generated electrical charge. In case a definite threshold is reached the gain switching gate can be switched on. The gain switching gate can be switched with respect to reaching a (lower) second threshold of the charge.

According to a further exemplary embodiment it is provided a detector, wherein the detector is adapted to switch on the first gain switching gate if the first capacitor is saturated. The latest time to switch on the gain switching gate can be regarded as the point of time that the capacitor is not able to store further charge. In this case the gain switching gate has to be switched on in order to avoid an overflow and a loss of electrical charge.

According to another exemplary embodiment it is provided a detector, wherein the detector is adapted to switch on the first gain switching gate in short pulses.

According to another exemplary embodiment it is provided a detector, wherein the detector comprises at least a third capacitor for being charged by an electrical charge, and at least a second gain switching gate, wherein the at least third capacitor is electrically connected with the unit for transforming via the second capacitor if the at least second gain switching gate is in on-state. The principle of the arrangement of additional capacitors for accumulating the electrical charge and a corresponding gain switching gate, which connects the additional capacitor with the photodiode can be repeated as far as necessary.

It can be seen as one aspect of the invention to reduce the amount of collected leakage current by activating the gain switching transistor or charge transfer gate only for multiple short periods of time during the integration time. In this way, the low shot noise and high dynamic range of the pixel are maintained even in the low sensitivity setting.

It should be noted that the above features may also be combined. The combination of the above features may also lead to synergetic effects, even if not explicitly described in detail.

These and other aspects of the present invention will become apparent from and elucidated with reference to the embodiments described hereinafter.

BRIEF DESCRIPTION OF THE DRAWINGS

Exemplary embodiments of the present invention will be described in the following with reference to the following drawings.

DETAILED DESCRIPTION OF EMBODIMENTS

The gain switching transistor has usually very low leakage currents when turned off, i.e. in the high sensitivity setting. In this case, the charge collection node has only a slight drop during the integration time. When the gain switch is turned on to set a lower sensitivity, charge leaks from the activated gain switch to ground. The charge collection node shows a large drop during the integration time due to the leakage charge. This has the same detrimental effects as a dark current in the photodiode, i.e. increased noise and decreased dynamic range due to the collected charge. Especially for long integration times, noise from the mentioned leakage current can become the dominant noise source in the pixel. There is the same problem if a transistor is used as a charge transfer gate.

Figure 1:
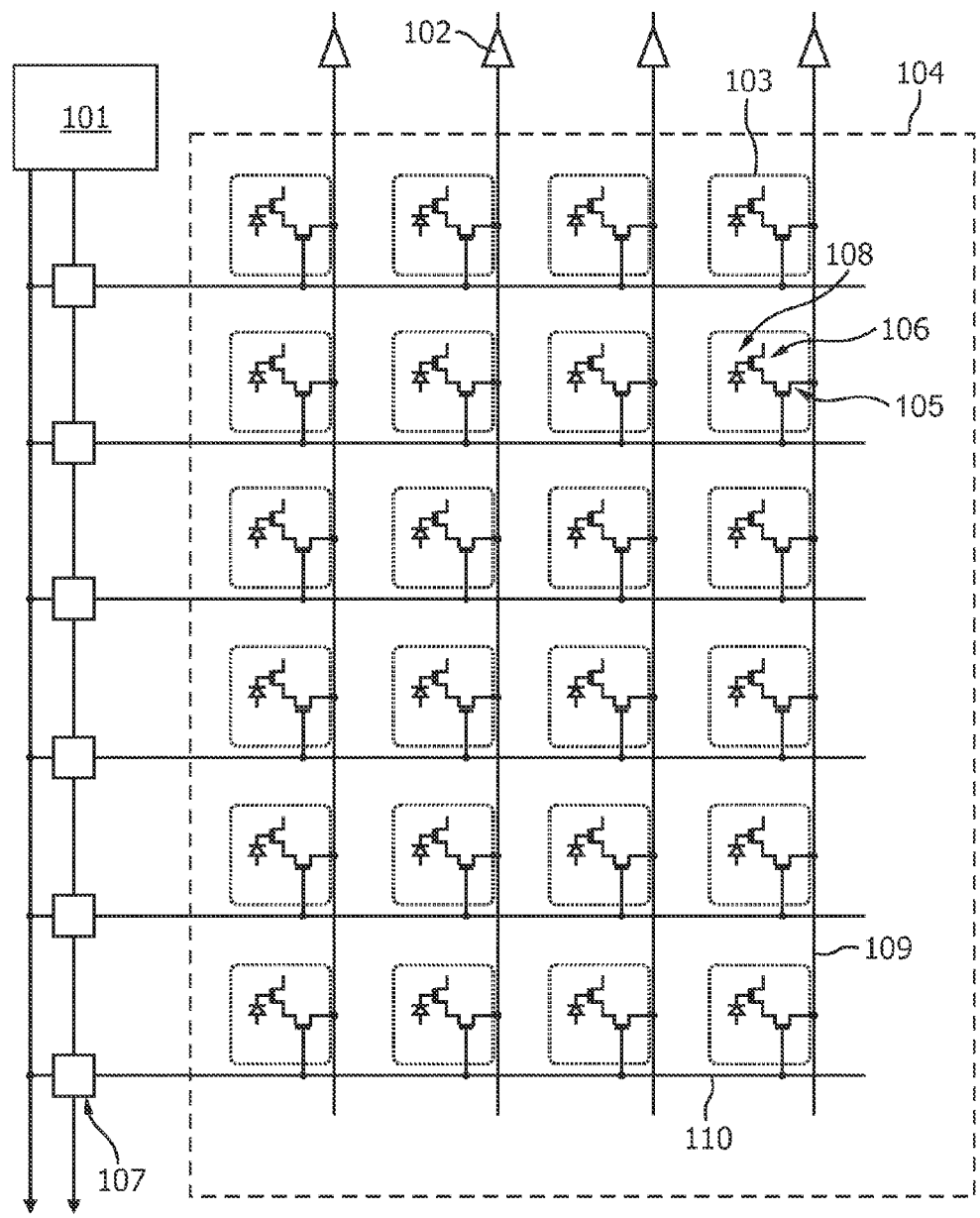
FIG. 1 shows an array of pixel sensors.

FIG. 1 depicts an array of pixel sensors 104. The means 101, 107 are adapted to control a row of pixel sensors by control lines 110 in order to read the signal of these pixel sensors 103. The selected signals will be transmitted to amplifiers 102 by lines 109. A pixel sensor comprises a photodiode 108, an amplifier 106 and a readout switch 105. The signal can be for example an electrical charge, a voltage or an electrical current.

Figure 2:
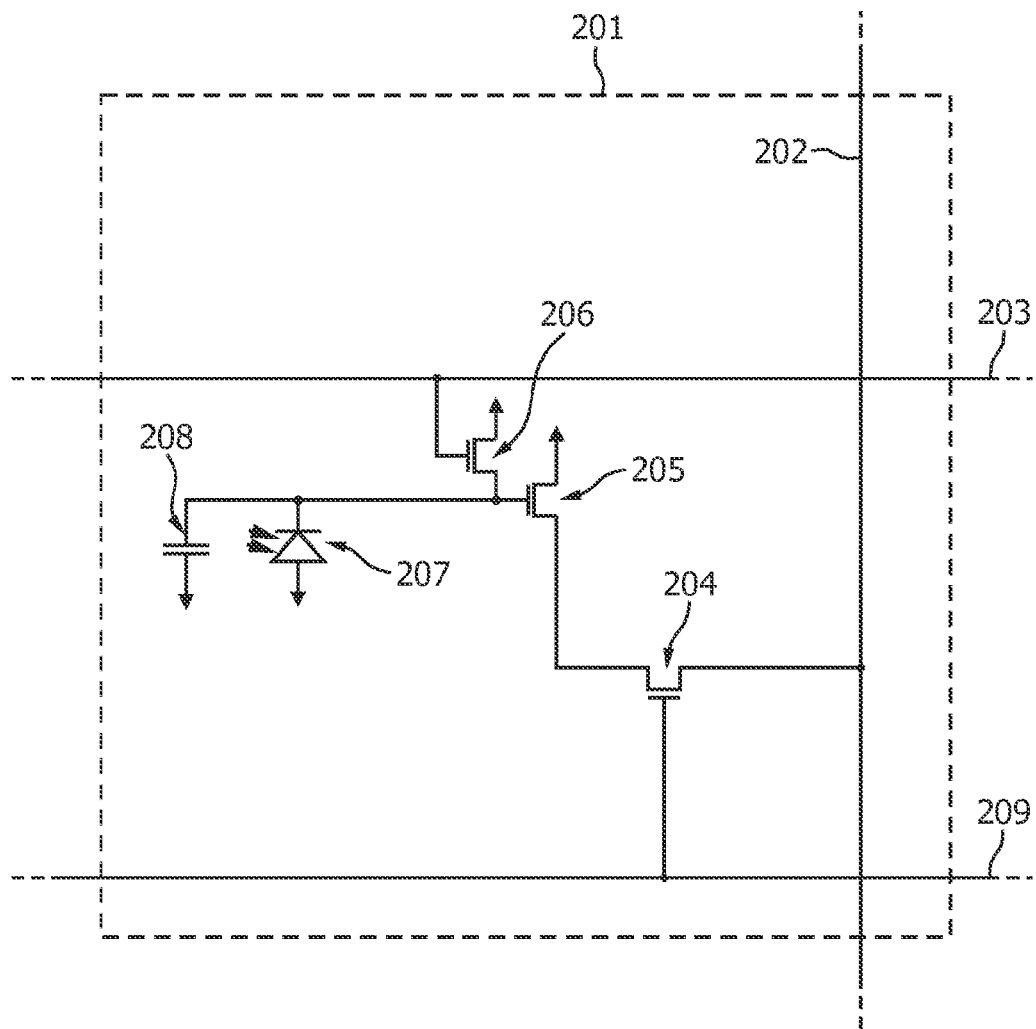
FIG. 2 shows a single pixel sensor.

FIG. 2 depicts a pixel sensor 201 in detail, wherein a photodiode 207 generates an electrical charge because of X-ray radiation. This charge will be stored by a capacitor 208. The reset switch 206 is adapted to set a starting point for the amount of charge. The amplifier 205 amplifies the signal for readout. The readout switch 204 provides the possibility to lead the signal to the input of an amplifier 202, wherein the readout switch 204 is controlled with the help of the control line 209.

Figure 3:
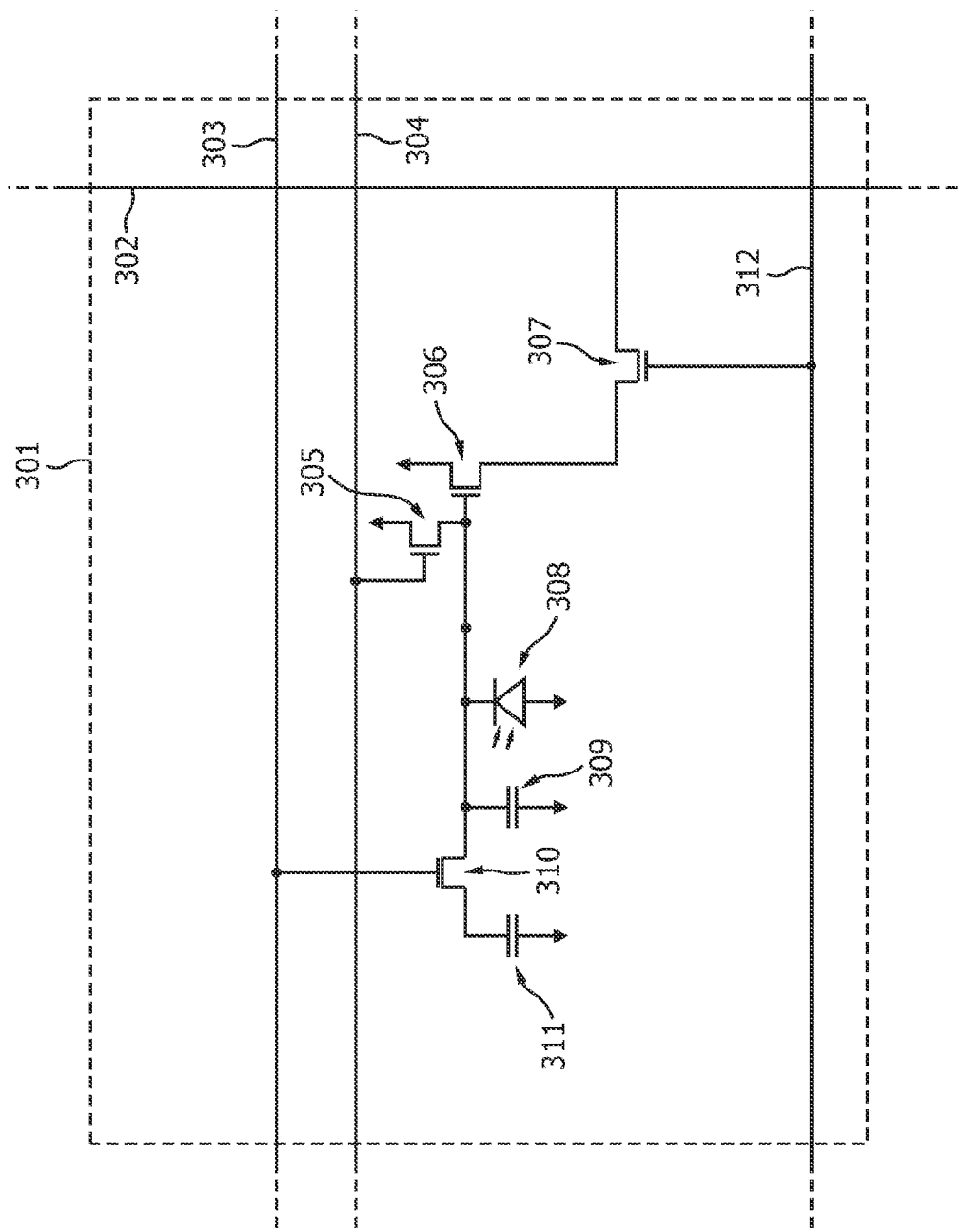
FIG. 3 shows a single pixel sensor with means for changing sensitivity.

FIG. 3 depicts a pixel sensor 301 with means for changing the sensitivity (gain selection), wherein a photodiode 308 transforms X-ray radiation into electrical charge, which leads via the capacitor 309 also to a voltage signal. This voltage can be detected by an amplifier. The signal can be transmitted to the connection to the input of the amplifier 302 with the help of the amplifier 306 and readout switch 307. The reset transistor 305 is necessary for resetting the capacitor 309 and photodiode 308 to initial condition prior to an exposure. The readout switch 307 is controlled by the control line 312. In case there is an on-state phase of the readout switch 307 the voltage signal of the photodiode 308 will be transferred from the capacitor 309 to the input of the amplifier 302. In case the gain switching gate 310 is in on-state phase the generated charge can be accumulated with the help of the capacitor 309 and the capacitor 311. In this situation the pixel sensor 301 has a smaller sensitivity than in the off-state of the gain switching gate 310. The gain switching gate 310 can be controlled by the control line 303. The gate 305 is controlled by the control line 304.

The following FIGS. 4, 5, 6 and 7 depict curves during the parameter time.

Figure 4:
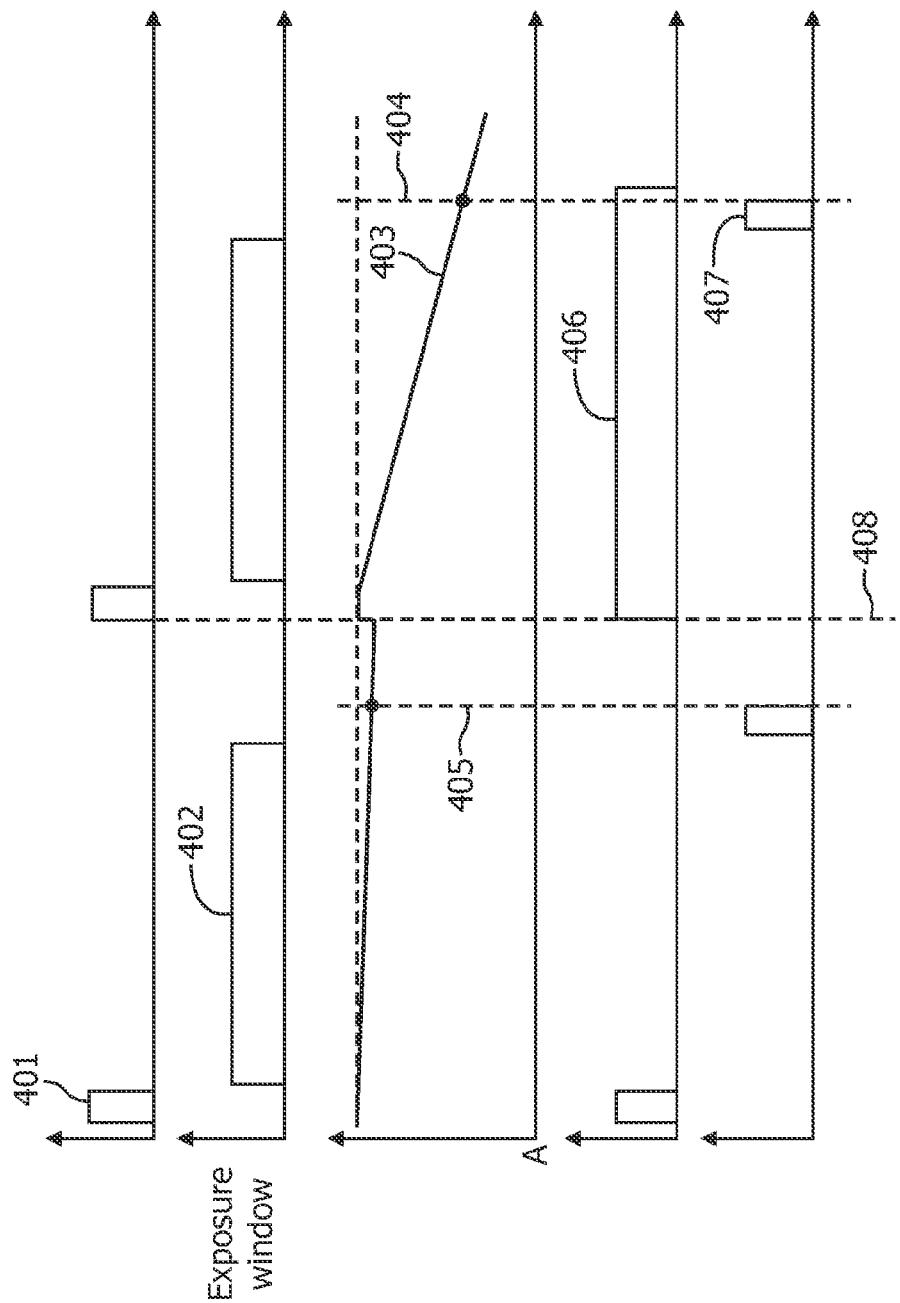
FIG. 4 depicts different characteristics.
Figure 5:
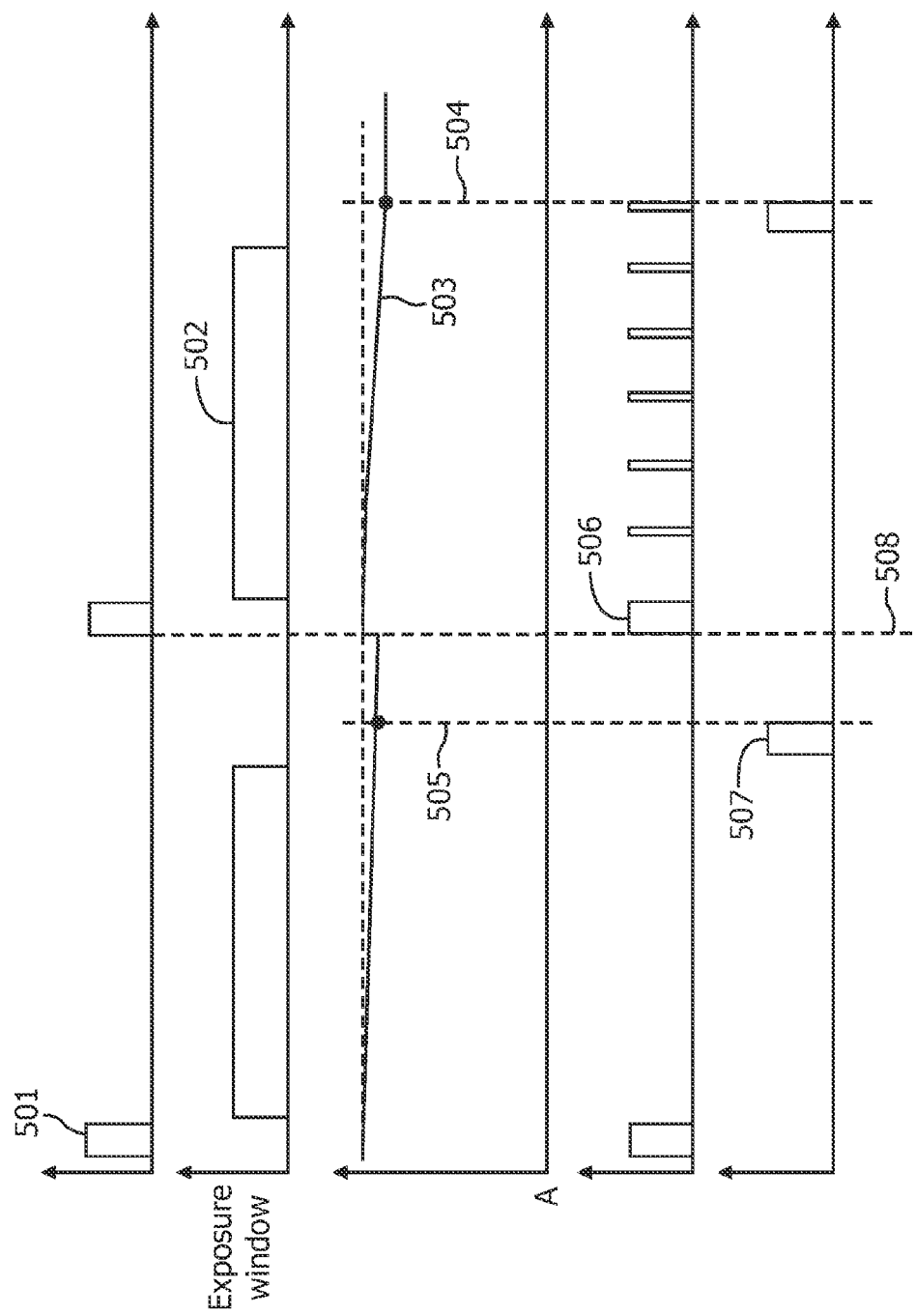
FIG. 5 depicts different characteristics.

FIG. 4 shows the voltage characteristics 401 of the control line for controlling a transistor for setting the capacitors on a starting level. The curve 402 is the on-characteristics of the exposure window. The curve 403 shows the progression of the voltage on the capacitor 309 due to charge which is generated by the photodiode and which is reduced because of leakage currents. Until the point in time 405 the charge is relatively constant due to only a minimal leakage. During the first time period until 405 the gain switching gate is only switched on during the reset period to reset both capacitors 309 and 311 (see curve 406). A second exposure and readout is depicted starting with the rising edge 408 of the second pulse on control lines 401. From this point in time 408 until 404 the gain switching gate is switched on for a long period (see curve 406). Due to this long on-state phase there are leakage currents in considerable extent. As a result thereof the charge is reduced during this phase considerably (see curve 403). The curve 407 depicts the progression of voltage of the readout switch.

FIG. 5 shows again the voltage characteristics 501 of the reset switch 305 of FIG. 3. Further, it shows the curve of the exposure window 502. The characteristics 503 depicts the progression of the voltage on the capacitor 309 due to charge from the photodiode and leakage currents. In the first phase until point of time 505 the voltage is relatively constant due to the fact that the gain switching gate 310 of FIG. 3 is only switched on during the reset phase (see curve 501, 506) and consequently leakage currents are low. In this first period there is no difference to FIG. 4. A second exposure and readout is depicted starting with the rising edge 508 of the second pulse on control lines 501. During the second period of time from 508 until 504 the gain switching gate will be switched on only for short periods of time (see curve 506). In comparison with the first period of time (until 505) there is a significant loss of charge but compared with the corresponding period of time (points of time 408 until 404) of the situation depicted in FIG. 4 there is a significant smaller drop in voltage due to the only short periods of leakage current. Therefore, by controlling the gain switching gate only for short periods of time the influence of leakage currents can be considerably reduced. The curve 507 depicts the on/off-state phases of the readout switch.

During the off-periods of the gain switching gate there is no on-state leakage. Only during the short on-periods there is leakage current because of the gain switching gate. Hence the amount of leakage charge in the complete integration period is strongly reduced compared to the normal mode of operation.

During the off-state of the gain switching gate, electrical charge originating from the X-ray illumination is collected only by the capacitor 309 of FIG. 3. During the on-state of the gain switching gate, the charge is redistributed between the capacitor 309 of FIG. 3 and the capacitor 311 of FIG. 3. Hence, it is essential that the gain switching gate is activated sufficiently often during the integration period to avoid overflow (saturation) of the capacitor 309. In case of overflow, charge would be lost and nonlinearity would result. In case of a constant X-ray signal, the gain switching gate needs to be activated at least as often as the ratio of maximum capacitance to smallest capacitance suggests. A higher number of active periods is recommended to cover also the case where the X-radiation varies during the integration time. The on-state phases of the charge transfer gate lead also to leakage current, which reduces the charge.

Figure 6:
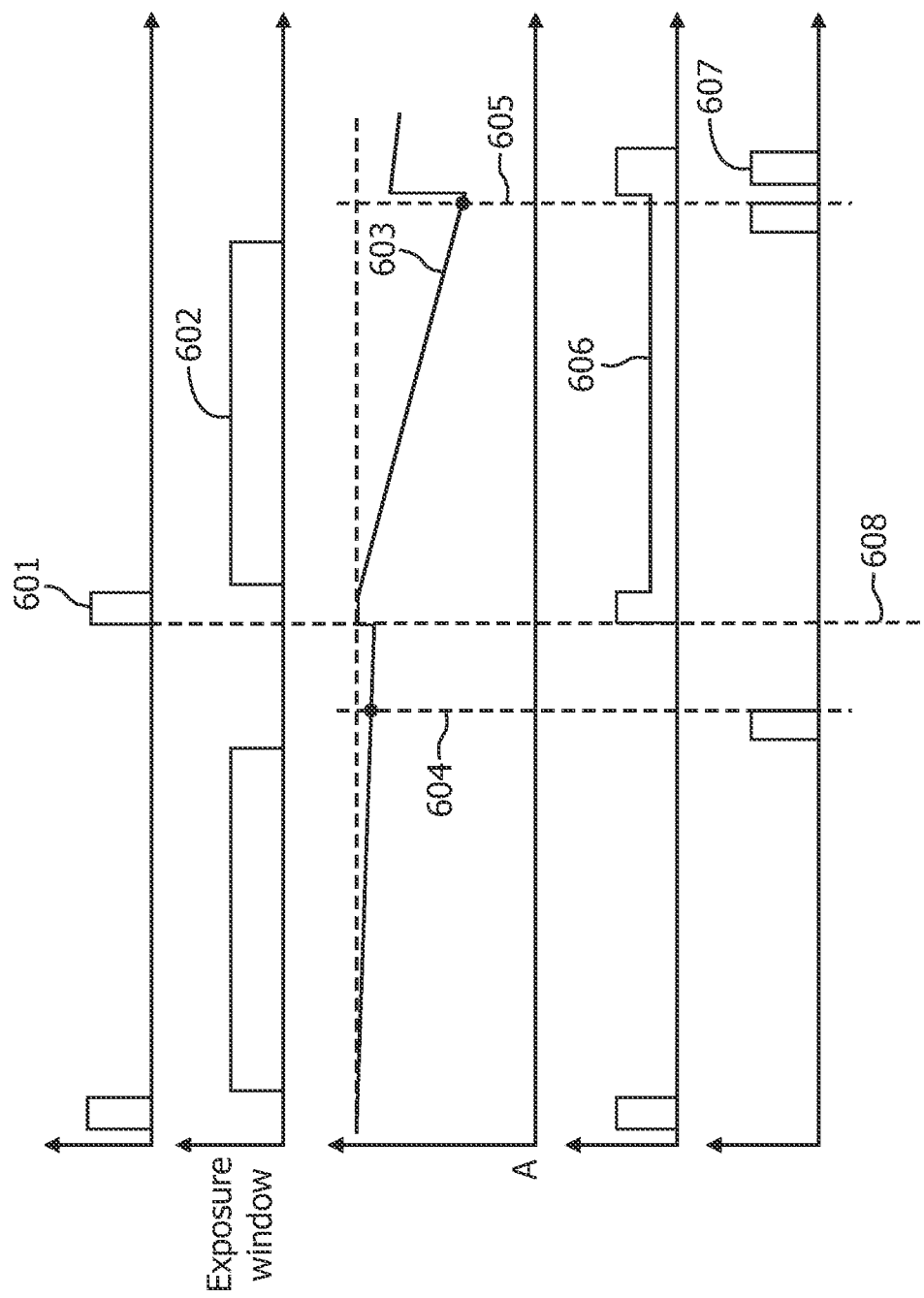
FIG. 6 depicts different characteristics.

FIG. 6 shows the voltage characteristics 601 of the controlling of the reset switch 305 of FIG. 3. The characteristics of the exposure window is depicted with the help of curve 602 during the parameter time. The curve 603 shows the voltage change on capacitor 309 of FIG. 3 due to charge generated by the photodiode and leaking gain switching gates over time. There is no difference until the point of time 604 if compared with the FIGS. 4 and 5. A second exposure and readout is depicted starting with the rising edge 608 of the second pulse on control lines 601. During the time period from this second reset 608 to 605 the gain switching gate 310 of FIG. 3 is switched on but the gain switching gate is not in a saturation phase. Due to this fact the leakage is significant, which can be recognized with the help of curve 603. The curve 607 depicts the progression of voltage of the controlling voltage of the readout switch.

Figure 7:
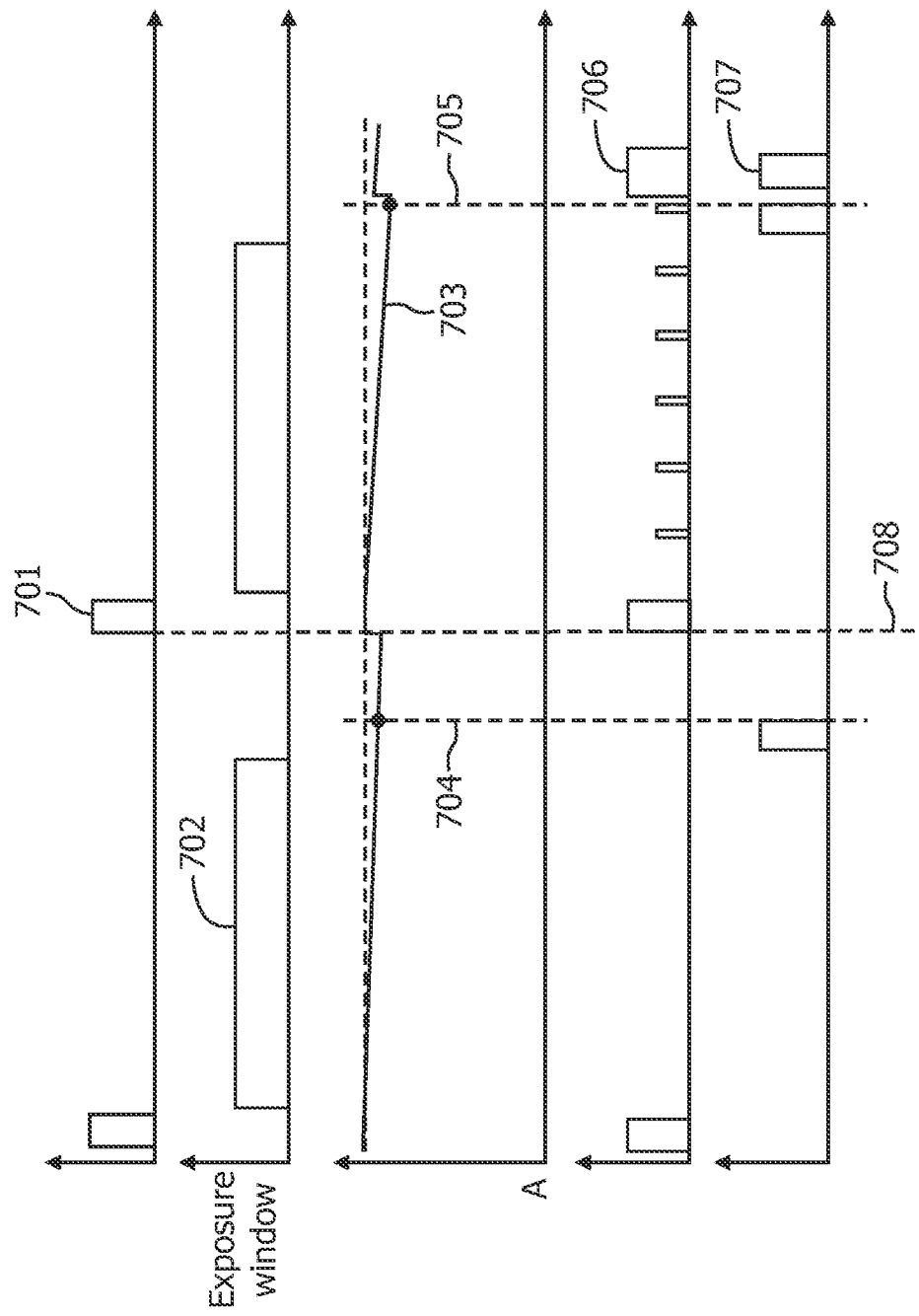
FIG. 7 depicts different characteristics.

FIG. 7 depicts the curve 701, which represents the controlling voltage of the reset switch 305 of FIG. 3. The curve 702 shows the exposure window. Again the first phase (period of time until 704) of the characteristics 703 is identical to the former FIGS. 4, 5 and 6. During the second period of time there are only short periods of time of on-state of the gain switching gate (706). Therefore, the loss of charge during this period of time is significantly small compared with the same period of time of FIG. 6. The curve 707 shows the on/off-state phases of the readout switch.

FIG. 6 shows the normal way of acquiring high sensitivity and low sensitivity images, FIG. 7 shows the driving of the charge transfer gate according to this invention.

The first halves of both figures show a single, high gain readout, the right halves show the double readout of first the high gain image, directly followed by the low gain image.

Figure 8:
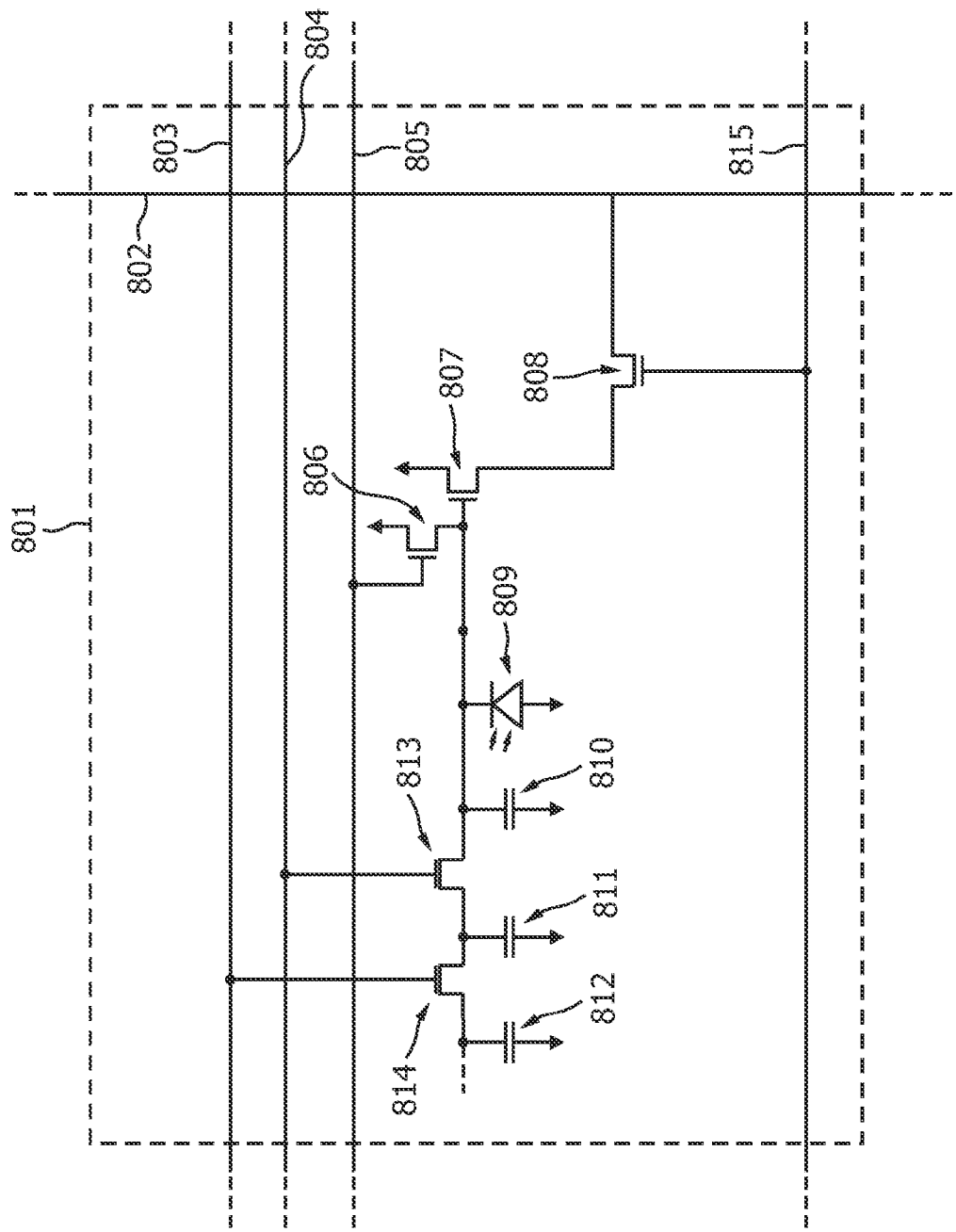
FIG. 8 shows a single pixel sensor with extended means for changing sensitivity.

FIG. 8 depicts a pixel sensor 801, wherein the charge generated by the photodiode 809 will be stored with the help of capacitor 810. In case the gain switching gate 813 is in on-state the charge is stored in the capacitors 810 and 811. In a third situation both gain switching gates 813, 814 are in on-state in this case the generated electrical charge can be stored by the three capacitors 810, 811 and 812. This principle arrangement (additional capacitor, which can be connected to the photodiode with an additional gain switching gate) can be extended as often as necessary. In case of application of all three capacitors 810, 811, 812 the sensitivity of the pixel sensor is reduced with respect to the situation of the transistor 814 and/or the transistor 813 are in off-state. The gain switching gate 813 is controlled by the control line 804, the gain switching gate 814 is controlled by the control line 803. The control line 805 controls the on/off-states of the reset switch 806, which brings the pixel sensor into a known initial condition. Transistor 807 is necessary for amplifying the signal of the pixel sensor 801. The readout switch 808 is controlled by the control line 815.

The invention can be extended to cover more than one gain setting. The gain switching gate or charge transfer gate need to be activated at least as often as the ratio of maximum capacitance to smallest capacitance suggests. The next switch/gate can be activated as often, or a reduced frequency can be applied, corresponding to the ratio of the maximum capacitance to the next capacitor and so on.

Switching noise (kTC) from activating and deactivating of the gain switching gate will cancel out because the noise charge deposited in the capacitors during turn-off of the switch will average out in the next on-period. Hence, signal to kTC noise ratio is not negatively affected by this invention.

The inventive concept can be used with active pixel medical X-ray detectors, detectors for non-destructive testing and optical imaging sensors. It is especially applicable to the CMOS based X-ray detectors for Cardiology and Mammography.

It should be noted that the term 'comprising' does not exclude other elements or steps and the 'a' or 'an' does not exclude a plurality. Also elements described in association with the different embodiments may be combined.

It should be noted that the reference signs in the claims shall not be construed as limiting the scope of the claims.

LIST OF REFERENCE SIGNS 101 means for controlling the readout switch,
102 amplifier,
103 pixel sensor,
104 array of pixel sensors,
105 readout switch,
106 amplifier,
107 means for controlling the readout switch,
108 photodiode,
109 input of amplifier,
110 control line,
201 pixel sensor,
202 input of amplifier,
203 control line,
204 readout switch,
205 amplifier,
206 reset switch,
207 photodiode,
208 capacitor,
209 control line,
301 pixel sensor,
302 input of amplifier,
303 control line,
304 control line,
305 reset switch,
306 amplifier, 307 readout switch,
308 photodiode,
309 capacitor,
310 gain switching gate,
311 capacitor,
312 control line,
401 reset signal,
402 exposure window,
403 characteristic of voltage on photodiode,
404 end of time period of on-state of the readout switch,
405 end of time period of on-state of the readout switch,
406 time period of on-state of gain switching gate,
407 characteristics of control voltage of readout switch,
408 rising edge of a pulse,
501 reset signal,
502 exposure window,
503 characteristic of voltage on photodiode,
504 end of time period of on-state of the readout switch,
505 end of time period of on-state of the readout switch,
506 time period of on-state of gain switching gate,
507 characteristics of control voltage of readout switch,
508 rising edge of a pulse,
601 reset signal,
602 exposure window,
603 characteristic of voltage on photodiode,
604 end of time period of on-state of the readout switch,
605 end of time period of on-state of the readout switch,
606 time period of on-state of gain switching gate,
607 characteristics of control voltage of readout switch
608 rising edge of a pulse,
701 reset signal,
702 exposure window,
703 characteristic of voltage on photodiode,
704 end of time period of on-state of the readout switch,
705 end of time period of on-state of the readout switch,
706 time period of on-state of gain switching gate,
707 characteristics of control voltage of readout switch,
708 rising edge of a pulse,
801 pixel sensor,
802 input of amplifier,
803 control line,
804 control line,
805 control line,
806 reset switch,
807 amplifier,
808 readout switch,
809 photodiode,
810 capacitor,
811 capacitor,
812 capacitor.
813 gain switching gate,
814 gain switching gate,
815 control line.

The invention claimed is:

1. An X-ray detector, comprising:
a unit configured to transform X-ray radiation into electrical charge;
a first capacitor configured to be charged by electrical charge generated by the unit, wherein the first capacitor is electrically connected to the unit;
a second capacitor configured to be charged by the electrical charge generated by the unit, wherein the second capacitor is connected to the unit; and
a first gain switching gate, wherein the second capacitor is electrically connected with the unit if the first gain switching gate is in an on-state, and
wherein during a first exposure window of the unit, the first gain switching gate is switched on for a continuously long period of time compared to a second exposure window of the unit, immediately following the first exposure window, such that during the second exposure window, the first gain switching gate is switched on in multiple discrete and discontinuous short periods of time in an on and off sequence during the second exposure window.

2. The X-ray detector according to claim 1, wherein the first capacitor is an intrinsic capacitor of the unit.

3. The X-ray detector according to claim 1, wherein the unit comprises:
a photodiode for transforming the X-ray radiation into the electrical charge.

4. The X-ray detector according to claim 1, wherein the unit comprises:
a scintillator for transforming the X-ray radiation into another radiation, and a photodiode for transforming the another radiation into the electrical charge.

5. The X-ray detector according to claim 1, wherein the unit comprises:
a photoconductor for transforming X-ray radiation into the electrical charge, and a charge collection electrode for collecting the electrical charge.

6. The X-ray detector according to claim 1, wherein the first gain switching gate is a gain switching transistor.

7. The X-ray detector according to claim 1, wherein the X-ray detector is adapted to switch on the first gain switching gate if the charge of the first capacitor has reached a definite threshold.

8. The X-ray detector according to claim 1, wherein the X-ray detector is adapted to switch on the first gain switching gate if the first capacitor is saturated.

9. The X-ray detector according to claim 1, wherein during the second exposure window, the X-ray detector is adapted to switch on the first gain switching gate for at least two short pulses separated by a period in which the first switching gate is switched off.

10. The X-ray detector according to claim 1, wherein the X-ray detector comprises:
at least a third capacitor for being charged by the electrical charge, and
at least a second gain switching gate, wherein the at least third capacitor is electrically connected with the unit if the at least second gain switching gate is in a respective on-state.

11. An X-ray system comprising the X-ray detector according to claim 1, wherein the X-ray system is adapted for gain selection, wherein the X-ray detector is adapted to switch on the first gain switching gate for short periods.

12. A method for using the X-ray detector according to claim 1, wherein the first gain switching gate is switched on only for the short periods of time for redistribution of electrical charge between the first capacitor and the second capacitor.

13. The X-ray detector according to claim 1, wherein the second exposure window is an integration period and the first exposure window is a reset phase, the integration period following the reset phase in which both the first and the second capacitors are reset.

* * * * *